United States Patent

[11] 3,620,930

[72] Inventors Lloyd D. Tschopp
 Humble;
 Rudolph C. Woerner, Houston, both of Tex.
[21] Appl. No. 865,272
[22] Filed Oct. 10, 1969
[45] Patented Nov. 16, 1971
[73] Assignee Petro-Tex Chemical Corporation
 Houston, Tex.

[54] REMOVAL OF METHYL ACETYLENE FROM BUTADIENE
 5 Claims, 1 Drawing Fig.
[52] U.S. Cl. .................................................. 203/87,
 203/DIG. 19, 203/94, 203/99, 260/681.5
[51] Int. Cl. .................................................. B01d 3/16
[50] Field of Search ............................................. 203/39, 50,
 76, 79, 85, 87, 92, 94, 95, 99; 260/94.2, 236.5,
 236.6, 681, 681.5

[56] References Cited
UNITED STATES PATENTS
2,434,923 1/1948 Hachmuth.................... 203/94
3,293,316 12/1966 Clay ............................ 260/681.5
2,925,452 2/1960 Broughton.................... 203/46 X
3,013,952 12/1961 Clay ............................ 260/681.5 X
3,317,627 5/1967 King et al..................... 260/681.5
3,423,385 1/1969 Bebb et al..................... 260/94.2

OTHER REFERENCES
D and F relate to purification of butadiene

Primary Examiner—Norman Yudkoff
Assistant Examiner—David Edwards
Attorney—G. Baxter Dunaway ABSTRACT: Methyl acetylene can be almost eliminated from a butadiene stream by fractionation and essentially all of the butadiene less the methyl acetylene recovered by carrying out the fractionation so that butadiene product stream is taken off the fractionator below the feed but above the bottom of the fractionator. The methyl acetylene is stripped out of the feed and concentrated in the upper portion of the fractionator and taken overhead in a butadiene stream from which it is separated, the butadiene stream being returned to fractionator in the methyl acetylene enriching portion of the fractionator. A feed stream containing 90.11 mole percent butadiene, 0.0191 mole percent butene-1, 9.85 mole percent butene-2, 113 p.p.m. vinyl acetylene and 135 methyl acetylene can be fractionated to recover 99.5 percent of the feed as product with essentially the same component distribution except for methyl acetylene which is reduced to 1.23 p.p.m. This reduction in acetylene content improves the ultimate butadiene product for use in solution polymerizations to produce copolymer rubbers.

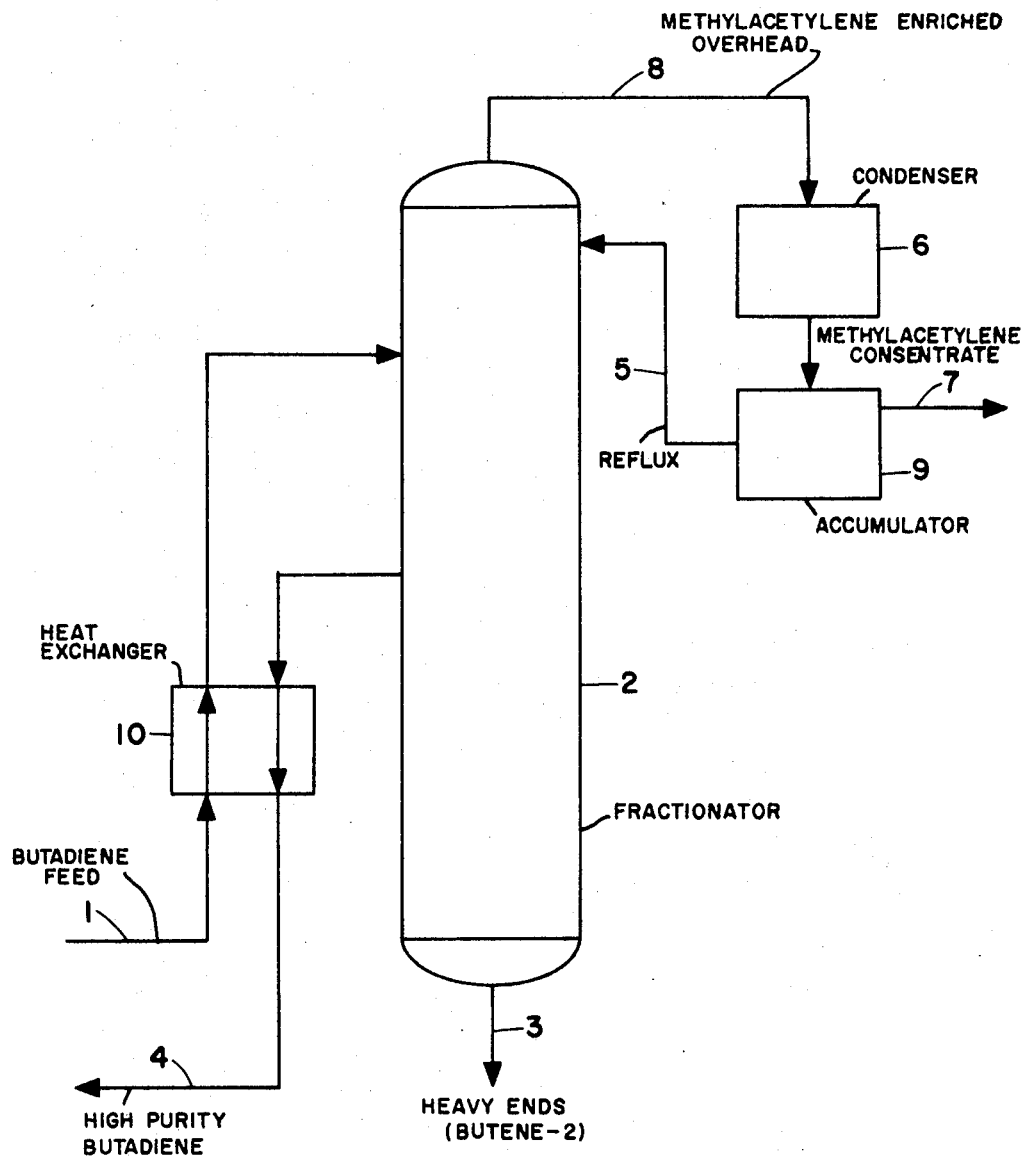

REMOVAL OF METHYL ACETYLENE FROM BUTADIENE

The present invention relates to the removal or separation of methyl acetylene from butadiene.

The principal use of butadiene is the preparation of synthetic rubber such as copolymers of butadiene and styrene and butadiene and acrylonitrile. These synthesis require an extremely pure butadiene with as little deleterious materials as possible remaining therein. Styrene-butadiene rubber is usually commercially prepared by less than a complete conversion of monomers to polymer, with the unreacted butadiene being recovered and recycled in the polymerization. Recycle of the butadiene causes a rapid buildup of acetylene impurities to beyond permissible levels with the inherent problems associated therewith.

Butadiene is prepared commercially by dehydrogenation of n-butane or n-butenes wherein small quantities of $C_3$ and $C_4$ acetylenes are produced. To obtain high-purity butadiene the dehydrogenated product is normally fractionated to concentrate the butadiene and the resulting product is either passed through a cuprous ammonium acetate wherein the alkadiene is dissolved or is treated by extractive distillation with a polar solvent such as furfural which dissolves butadiene and then the butadiene is desorbed. In most processes the desorbed material is fractionally distilled to further purify the butadiene. Butadiene which is purified by extractive distillation and a final fractional distillation normally contains alkyne as an impurity in the final product. It has been extremely difficult on a commercial scale to produce high purity butadiene without alkyne impurities. Many procedures have been proposed for reducing the alkyne content of butadiene; for example, U.S. Pat. No. 2,415,006, Hachmuth; U.S. Pat. No. 2,434,923, Hachmuth; U.S. Pat. No. 3,242,227, Kroeper, et al., U.S. Pat. No. 3,293,316, Clay and U.S. Pat. No. 3,317,627, King, et al. The present invention is directed to the removal of methyl acetylene from butadiene. Methyl acetylene is a trace impurity in butadiene being measured in parts per million. Methyl acetylene is the lowest boiling of the acetylene impurities and boils below butadiene. Removal of such small quantities is an extremely difficult task, however, by practice of the present invention it is possible to reduce the methyl acetylene content of commercial butadiene to near extinction.

Another feature of the present invention is the relatively high degree of concentration of methyl acetylene possible. In past separations the methyl acetylene was principally removed in conjunction with the removal of other light impurities, namely, $C_3$ and such as propane, etc., by depropanizing, for example. This approach results in very dilute methyl acetylene streams wherein the methyl acetylene may be only 10 or 100 times more concentrated than in the original stream whereas in the instant process the methyl acetylene can be concentrated ten thousand fold over the feed stream concentration. This stream can be further fractionated to recover more of the butadiene and to produce methyl acetylene for commercial application. Care should be taken in handling concentrated methyl acetylene since it tends to undergo uncontrollable polymerization at elevated temperatures and forms highly unstable compounds with copper and mercury.

Another conventional approach is to separate methyl acetylene in the same fractionator used for separating butadiene from less volatile hydrocarbons by taking a side stream above the feed, near the top of the column for butadiene product and passing methyl acetylene overhead along with a portion of the butadiene. Such a process is shown in U.S. Pat. No. 2,434,923. Although the methyl acetylene is concentrated in the overhead far less methyl acetylene is removed from the butadiene product by the prior procedure than by the present invention. The amount of methyl acetylene remaining in the butadiene product is 100-200 times that of the present invention. Thus, neither of these approaches results in the low levels of methyl acetylene possible with the present process.

It has been found that the removal and concentration of methyl acetylene from butadiene can be achieved in a fractionator by removing the butadiene stream from the fractionator at a point below the feed and removing the methyl acetylene containing stream from the top of fractionator. Briefly stated, the present invention is a process of removing methyl acetylene from a hydrocarbon mixture containing butadiene and methyl acetylene comprising passing said mixture to a fractionator, withdrawing an overhead mixture comprising butadiene and methyl acetylene, condensing a portion of said overhead, withdrawing from said overhead a fraction containing methyl acetylene in the same or substantially higher concentration than either the overhead vapor or the liquid condensate, returning the residual liquid condensate to the top of said fractionator as reflux and withdrawing liquid butadiene product at a point in the fractionator below the point where the hydrocarbon mixture enters said fractionator but substantially above the bottom thereof, said butadiene product being substantially lower in methyl acetylene concentration than said hydrocarbon mixture. The portion of the overhead that is condensed can comprise up to essentially all of the overhead vapors from the fractionator.

The methyl acetylene can be recovered by several embodiments, e.g. (a) a portion of the condensate can be withdrawn giving a fraction having the same concentration of MA as the condensate with the remainder of the condensate returned as reflux; (b) some of the uncondensed overhead vapors can be withdrawn prior to condensation again giving a fraction having the same MA concentration as the condensate which is returned as reflux; and (c) only a portion of the overhead is condensed and all or a portion of the remaining vapors are withdrawn after condensation giving a fraction having a higher MA concentration than the overhead or the condensate said condensate being reflux. Any one of these embodiments can be employed or any combination thereof.

The source of the feed to the fractionator is not important. The butadiene stream can be derived, for example, from the dehydrogenation of normal butenes, the oxidative dehydrogenation of n-butane or cracking and reforming processes. The initial feed stream containing butadiene is usually a very complex mixture including, for example, methane, ethane, ethylene, propane, propylene, propadiene, isobutylene, butene-1, butene-2 (both high and low boiling) n-butane, butadiene-1,2, butadiene-1,3 a heavy fraction of $C_5$ and more carbon atoms and small quantities of both methyl acetylene and vinyl acetylene. The fractionation of the present invention is generally directed to a butadiene stream that has been partially purified. For example, depending on the nature of the stream, the butadiene stream has been depropanized to remove the $C_3$ and lighter hydrocarbon including a large quantity of methyl acetylene originally present, further fractionated to separate $C_4$ hydrocarbons from $C_5$ and heavier hydrocarbons, subjected to one or more extractive distillations to remove less saturated compounds and fractional distillation to separate the butadiene from vinyl acetylene and butene-2. For the purpose of illustrating the present process a relatively high purity butadiene stream containing principally butene-2 (both high and low boiling) vinyl acetylene and a trace of methyl acetylene will be employed. It is to be understood that other materials can be present in the butadiene stream to be fractionated and the stream may be less pure or more pure than illustrated. Impurities more volatile than butadiene will be carried off in the overhead with methyl acetylene whereas impurities less volatile than butadiene will for the most part continue in the butadiene stream or pass off in the bottoms purge. Even with considerable variation in the butadiene feed to the fractionator, the benefits of high methyl acetylene removal and concentration thereof can be achieved according to this invention. A particularly useful stream would be one containing at least 60 mole percent butadiene and preferably 80-99.8 mole percent butadiene and 0.2-20 mole percent butene-2. After the removal of methyl acetylene the butadiene stream according to the invention can be further treated, for example, a fractionation to separate butene-2.

A particular feature of the present invention is the location of the butadiene product withdraw which is below the feed, so that the methyl acetylene stripped out of the feed does not have the opportunity to contact the product and recontaminate it, but substantially above the bottom of the fractionator. Butadiene is susceptible to polymerization at the temperatures normally found in the bottom section of a commercial distillation unit and it has been found that by placing the butadiene product withdraw well above the bottom that the butadiene concentration is substantially reduced in the bottom, high temperature section, of the unit thus reducing or eliminating polymerization and the fouling associated therewith. The product withdrawal would satisfactorily be in the upper three quarters of the fractionator probably somewhat below the middle thereof.

In one embodiment of the present process as will be described in detail later very little of the feed is either taken off overhead or as bottoms. For example, in typical operation of a feed flow of 100 barrels per hour will give an overhead withdrawal of 0.25 barrels per hour and a bottoms withdrawal of 0.20 barrels per hour with the balance, 99.55 barrels per hour being butadiene product. Because of the small quantities in both the overhead and bottoms withdrawal the entire fractionation is very sensitive to temperature change which can double or triple the overhead or bottom withdrawal. In a preferred embodiment the feed is preheated to the approximate temperature of the fractionation zone where the feed enters. This is conveniently done by heat exchange between the incoming feed and outgoing product.

In another embodiment of the present invention a substantial portion of the butadiene feed is taken off overhead with the methyl acetylene. The term substantial is used to indicate more than a minor amount, for example, in this embodiment 10 to 90 percent of the feed can be taken off overhead. This stream constitutes a second butadiene product stream which will have contained therein most of the methyl acetylene contained in the feed. Thus, since the second butadiene product stream will have considerably less butadiene than the feed stream but will have substantially all of the methyl acetylene in the feed, the second butadiene product stream will have a higher methyl acetylene concentration than the feed or the first butadiene product stream that is withdrawn below the feed stream. For example, according to this embodiment 100 tons a day feed of 90 percent butadiene with 200 p.p.m. methyl acetylene to the fractionator would give 33.3 tons/day first butadiene product stream taken off below the feed stream being about 10 p.p.m. methyl acetylene and 88 percent purity the remainder being, e.g., butene-2. A second butadiene product stream taken off overhead as a liquid stream of 66.6 tons/day would give 99.5 percent purity and 295 p.p.m. methyl acetylene and a 0.1 ton/day bottoms withdrawal. This second butadiene product stream would be suitable in a SBR polymerization where the unreacted butadiene material was not intended for polymerization recycle but could be returned to a butadiene purification process for repurification to remove the excess of methyl acetylene and recover the unpolymerized butadiene.

The first butadiene product stream is essentially free of methyl acetylene and after a final distillation to separate the butene-2 a butadiene of 99.5 percent+purity is obtained.

The drawing is a schematic representation, a preferred embodiment of the present process.

A feed stream which in the preferred situation is predominately butadiene-1,3 with small amounts of butene-2, butene-1 and trace quantities of vinyl acetylene and methyl acetylene is fed to a fractionator 2. The fractionator is a conventional distillation tower or column and can have from 50 to 150 trays. The temperature of operation is conventional for butadiene fractionation. The temperature gradient through fractionator 2 will generally be 20° to 30° F. with the lower portion of the tower having temperatures generally of 140° to 200° F. and lower temperatures in the upper portion. The feed is preheated prior to entering the fractionator by heat exchange with the butadiene product stream 4 in heat exchanger 10.

The upper portion of the tower above the feed entry 1 is in effect a methyl acetylene enriching section. The methyl acetylene enriched vapors pass out of the fractionator 2 via 8 to the overhead condenser 6 and hence to the overhead accumulator 9 where a portion of the butadiene is recovered and returned as reflux via 5 to the fractionator intermediate between the top of the tower and the feed 1. A concentrated stream of methyl acetylene passes from the accumulator 9 through 7. In one embodiment, this stream will normally contain 5 to 10 percent methyl acetylene (higher concentrations are possible within the margin of safety, i.e. up to about 50 percent), the balance being chiefly butadiene. In this procedure stream 7 is taken off the accumulator 9 as a vapor thus giving stream 7 a higher concentration of methyl acetylene than either the overhead stream 8 or the reflux stream 5. However, stream 7 can be taken off as a liquid and then would have the same composition as streams 8 and 5. Stream 7 can be further fractionated (not shown) or returned to a dehydrogenation (not shown) where it will be altered producing less unsaturated hydrocarbons, carbon gases and coke.

The heavy ends which are predominately butene-2 pass off via 3. The fractionator would conventionally be equipped with a reboiler (not shown). The butadiene concentration is quite low in the lower portion of the tower thus reducing polymerization.

The butadiene product passing out through line 4 has a greatly reduced methyl acetylene content; however, the remainder of stream 4 has essentially the composition of feed stream 1. The concentration of methyl acetylene will depend to an extent on the makeup of the feed stream 1; however, normally it can be expected that the methyl acetylene concentration in the butadiene product will be less than 20 p.p.m. and preferably less than 10 p.p.m. Generally, the feed to fractionator will contain less than 500 p.p.m. methyl acetylene, the greater part of the methyl acetylene having been removed previously although the process can operate with considerably higher concentration, for example, up to 2,000 p.p.m. to produce butadiene product essentially free of methyl acetylene.

The butadiene product stream 4 can be further fractionated to separate butadiene from residual butene-2. The extent and nature of any further treatment the butadiene product will need depends on the location of the present process in the overall butadiene recovery process. As indicated above, it is preferred that present fractionation come near or at the end of the butadiene recovery process.

Referring again to the drawing a brief description of the embodiment having a second butadiene product stream will be given. The feed stream 1 is composed of 90.1 mole percent butadiene-1,3, 9.9 mole percent butene-2 and trace quantities of vinyl acetylene and methyl acetylene, i.e. 113 p.p.m. and 135 p.p.m. respectively. The feed stream 1 passes into the fractionator 2 at a rate of 600 tons per day. The tower is as previously described with additional means (not shown) for heating the feed. As the feed enters, a portion, in this case about 400 tons per day, is vaporized and passes out through 8 to the overhead condenser 6 and overhead accumulator 9. A first butadiene product stream is taken off at 4. This stream accounts for about 200 tons per day of the feed. The methyl acetylene content of stream 4 is 10 p.p.m. Stream 4 is about 88 mole percent butadiene. A second butadiene product stream of about 360 tons/day is taken off the overhead accumulator 9 as a liquid stream 7. This stream is 99.5 mole percent butadiene with 219 p.p.m. methyl acetylene. A small portion of the overhead is returned via 5 as reflux. The vaporous overhead 8, the second butadiene product stream 7 and reflux 5 all have the same composition. A bottom fraction which is predominately butene-2 is taken off as stream 3 at a rate of about 40 tons/day.

The following Example is given to further illustrate the invention and is directed to the drawing.

EXAMPLE

All percents are mole percents unless otherwise specified, all flowrates are calculated at 60° F. unless otherwise indicated regardless of the temperature of the stream. The example is related to the drawing; however, it should be understood that the drawing is a schematic and the actual operation of the process is carried out in conventional fractionating equipment and means which are well known in the art. Certain of the equipment and means are well known but are not shown in the drawing. The fractionator 2 is a 100-tray distillation column. The hydrocarbon feed 1 is fed at a rate of about 352.5 barrels per hour and has a composition of:

| Component | Mole Percent |
|---|---|
| Butene-1 | 0.0191 |
| Butene-2 (low boiling) | 5.41 |
| Butene-2 (high boiling) | 4.44 |
| Butadiene | 90.11 |
| Vinyl Acetylene | 0.0113 |
| Methyl acetylene | 0.0135 |

The feed 1 is at a temperature of 110° F. as the result of prior treatment (not shown). It is passed through heat exchanger 10 where it is heated to 129° F. by outcoming butadiene product 4 which enters heat exchanger 10 at 136° F. and leaves the exchanger at a temperature of 117° F. The maximum vapor space pressure in the fractionator is 86 p.s.i.g. and the maximum temperature is 152° F. found in the lower section. The overhead 8 from the fractionator is at 128° F. and 76 p.s.i.g. The overhead 8 flows at a rate of 101,785 pounds per hour into overhead vapor condenser 6 and hence into overhead accumulator 10. From the overhead accumulator 10 a concentrated methyl acetylene stream 7 is drawn off. Stream 7 has a flow of 0.9 barrels per hour at 120° F. The composition of stream 7 is

| Component | Mole Percent |
|---|---|
| Butene-1 | 0.0655 |
| Butene-2 (L) | 2.36 |
| Butene-2 (H) | 0.355 |
| Butadiene | 92.08 |
| Vinyl Acetylene | 0.00247 |
| Methyl Acetylene | 5.136 |

Stream 5 at 120° F. is cycled back to the upper portion of the fractionator as reflux at a rate of 458.7 barrels per hour. A bottoms purge 3 is drawn off at a rate of 0.7 barrel per hour removing the heavy ends having the composition

| Component | Mole Percent |
|---|---|
| Butene-1 | 0.00769 |
| Butene-2 (L) | 7.071 |
| Butene-2 (H) | 92.23 |
| Butadiene | 0.6692 |
| Vinyl Acetylene | 0.0231 |
| Methyl Acetylene | 0.00003 |

The butadiene product stream 4 flows at 350.9 barrels per hour and passes through the heat exchanger 10 as indicated above. This stream has the following composition:

| Component | Mole Percent |
|---|---|
| Butene-1 | 0.0190 |
| Butene-2 (L) | 5.42 |
| Butene-2 (H) | 4.45 |
| Butadiene | 90.10 |
| Vinyl Acetylene | 0.0113 |
| Methyl Acetylene | 0.000123 |

Thus, the butadiene product stream 4 which represents 99.5 percent of the feed stream has essentially the same composition as the feed stream 1 except that methyl acetylene is only 1.23 p.p.m.

In order to bring the product stream up to butadiene specification of 99.5 percent (minimum) assay there would be a final fractionation (not shown) to separate the butadiene from the residual butene-2 (both high and low boiling).

The present system is pressured and heated by steam at a rate of 17,850 pounds per hour and 250° F. by conventional means not shown. There is also a sodium nitrite solution added to the fractionator (by means not shown) as an oxygen scavenger. Some water and sodium nitrite enter the various streams and are completely removed conventionally in knockout pots, accumulators or the like and are not reported in the components of the streams given above.

The invention claimed is:

1. A process of removing methyl acetylene from a hydrocarbon mixture containing a major proportion of butadiene and a minor proportion of methyl acetylene comprising passing said mixture to a fractionator, withdrawing an overhead mixture comprising butadiene and methyl acetylene, condensing a portion of said overhead, withdrawing from said overhead a fraction containing methyl acetylene in the same or substantially higher concentration than either the overhead vapor or the liquid condensate, returning the residual liquid condensate to the top of said fractionator and withdrawing liquid butadiene product at a point in the fractionator below the point where the hydrocarbon mixture enters said fractionator, but substantially above the bottom thereof, said butadiene product being substantially lower in methyl acetylene concentration than said hydrocarbon mixture.

2. The process according to claim 1 wherein the fraction containing methyl acetylene is withdrawn from said condensate.

3. The process according to claim 1 wherein a vaporous fraction containing methyl acetylene is substantially higher concentration than either the overhead vapor or the condensed overhead is withdrawn from said overhead and substantially all of said hydrocarbon mixture is recovered as butadiene product.

4. A process for removing methyl acetylene from a hydrocarbon mixture comprising 80 to 99.8 mole percent butadiene, 20 to 0.2 mole percent butene-2 and less than 2,000 parts per million (mole) methyl acetylene comprising passing the mixture to a fractionator said mixture being at approximately the same temperature as the fractionator at the point where it enters said fractionator, withdrawing an overhead mixture comprising butadiene and methyl acetylene, condensing a portion of said overhead, withdrawing from said overhead a vaporous fraction containing methyl acetylene in substantially higher concentration than either the overhead vapor or the liquid condensate, returning the residual liquid condensate to the top of said fractionator as reflux and withdrawing liquid butadiene product having less than 20 parts per million methyl acetylene, at a point in the upper three-fourths of the fractionator below the point where the hydrocarbon mixture enters said fractionator, said butadiene product having essentially the same composition as said hydrocarbon mixture and representing substantially all of said hydrocarbon mixture passed to said fractionator.

5. The process according to claim 4 wherein a liquid fraction containing methyl acetylene in substantially the same concentration as the condensed overhead is withdrawn.

* * * * *

PO-1050
(5/69)

UNITED STATES PATENT OFFICE
CERTIFICATE OF CORRECTION

Patent No. 3,620,930          Dated November 16, 1971

Inventor(s)    Lloyd D. Tschopp and Rudolph C. Woerner

It is certified that error appears in the above-identified patent and that said Letters Patent are hereby corrected as shown below:

Cover Sheet, Col. 2 lines 1 & 2, please delete

"OTHER REFERENCES

D and F relate to purification of butadiene".

Signed and sealed this 27th day of June 1972.

(SEAL)
Attest:

EDWARD M. FLETCHER, JR.        ROBERT GOTTSCHALK
Attesting Officer               Commissioner of Patents